(No Model.)  2 Sheets—Sheet 1.

E. H. BACON.
BRAKE FOR VEHICLES.

No. 372,194. Patented Oct. 25, 1887.

(No Model.) 2 Sheets—Sheet 2.

E. H. BACON.
BRAKE FOR VEHICLES.

No. 372,194. Patented Oct. 25, 1887.

Witnesses
Inventor
Edward H. Bacon
By his Attorney

UNITED STATES PATENT OFFICE.

EDWARD HAMLIN BACON, OF SAN ANTONIO, TEXAS.

BRAKE FOR VEHICLES.

SPECIFICATION forming part of Letters Patent No. 372,194, dated October 25, 1887.

Application filed June 13, 1887. Serial No. 241,142. (No model.)

*To all whom it may concern:*

Be it known that I, EDWARD HAMLIN BACON, of San Antonio, in the county of Bexar and State of Texas, have invented certain new and useful Improvements in Brakes for Vehicles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to brakes for wagons and other vehicles, and has for its object to furnish a brake which shall be easy in operation, cheap in construction, and not liable to get out of order.

My invention will be first fully described, and afterward specifically pointed out in the claims.

Figure 1:
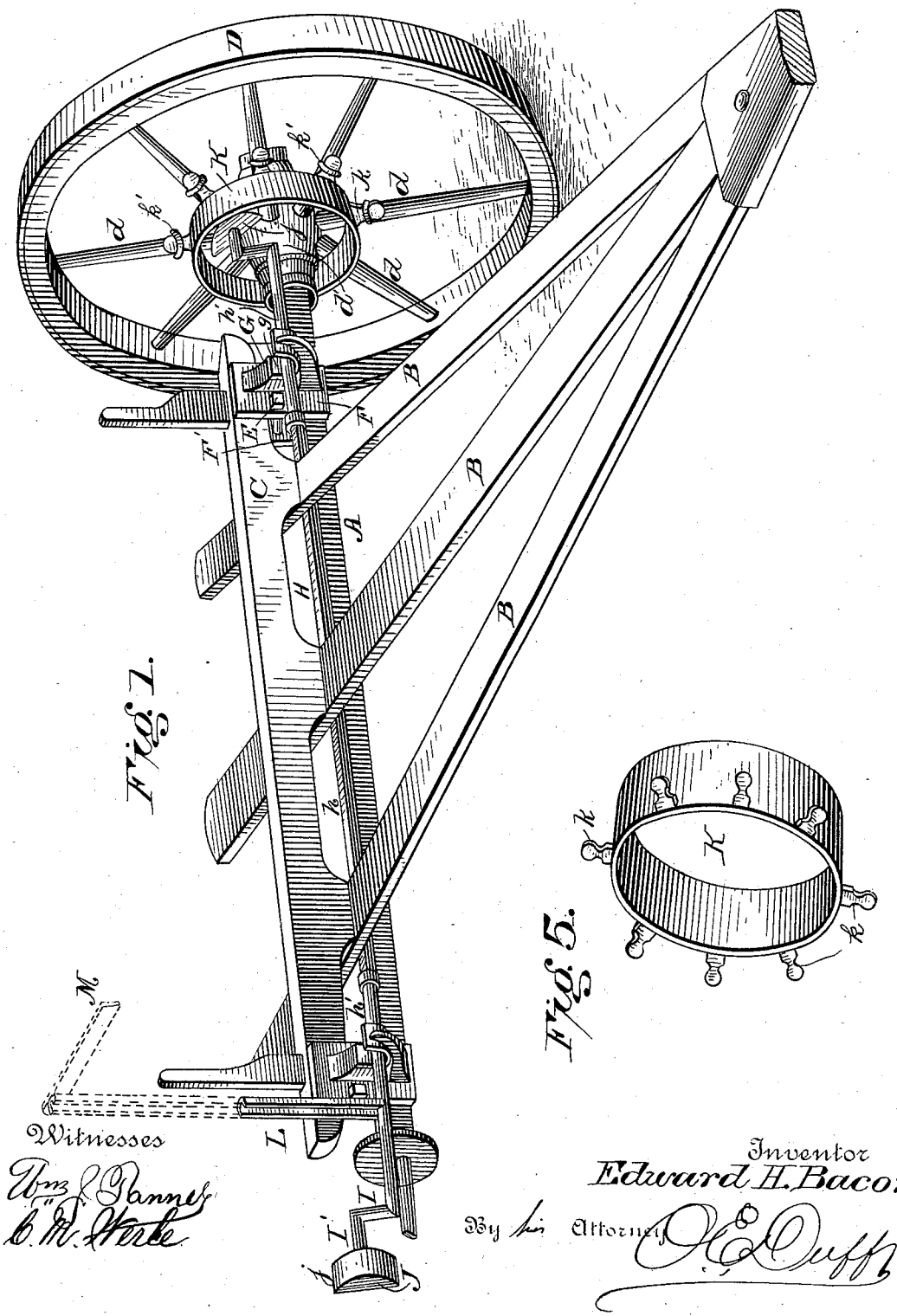
Figure 2:
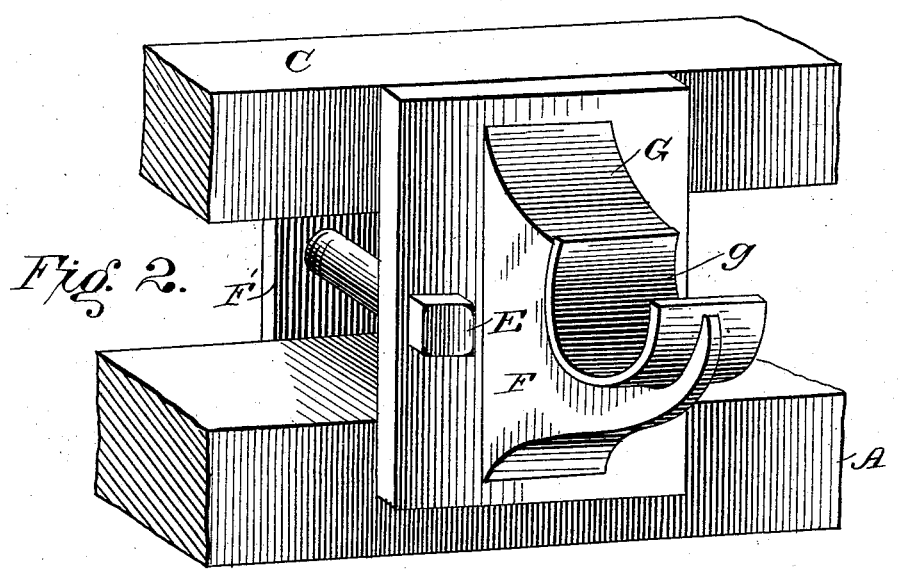
Figure 3:
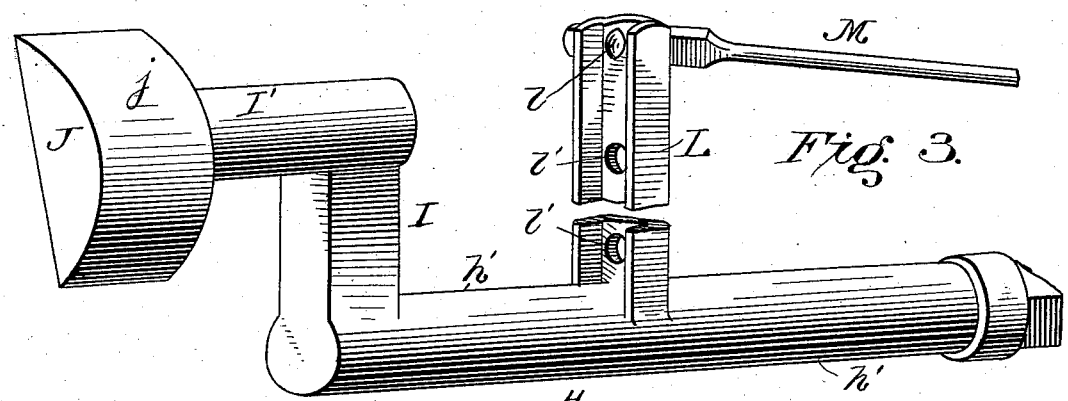
Figure 4:
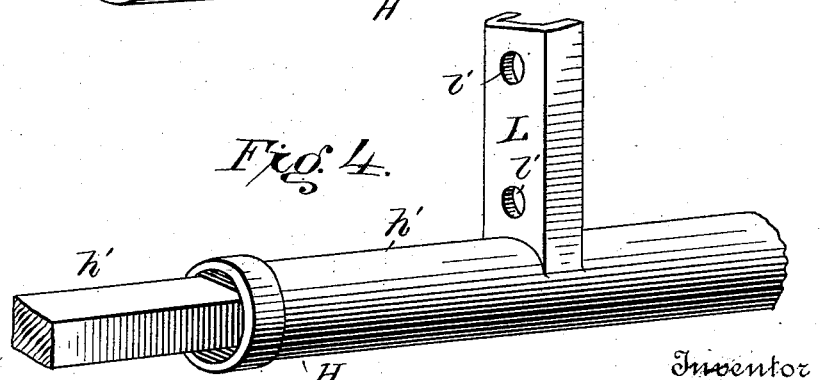

In the accompanying drawings, Figure 1 is a perspective view of my improved brake and as much of a wagon as is necessary to illustrate its application thereto. Fig. 2 is a perspective view on an enlarged scale, showing the manner of securing the brake-supporting rod to the axle and bolster. Fig. 3 is a view in perspective, showing a portion of the brake-supporting-rod, lever, and shoe, and part of the mechanism for turning the supporting-rod and thus actuating the brake. Fig. 4 is a perspective view showing a portion of the parts shown in Fig. 3, but in a reversed position. Fig. 5 is a perspective view of the drum, which I secure to the inside, in which the brake-shoe operates.

Like letters of reference mark the same parts wherever they occur in the various figures of the drawings.

Referring to the drawings by letters, A is the axle, B the hounds, C the bolster, and D the wheels, of an ordinary running-gear.

The wheels are, as usual, provided with spokes $d$ and hubs $d'$. Secured against the axle and bolster near each end by bolts E is a plate, F, carrying a bracket, G, for receiving and supporting a rod, H, the central portion, $h$, of which is of square and the ends $h'$ of round iron, the round portions resting in the curved seats $g$ of the bracket G, whereby the rod may be turned therein. The bolts E pass through the plates F, thence between the axle A and bolster C, and thence through a plate, F', on the opposite side thereof, thus securely clamping the plate F and bracket G to the bolster and axle.

The rod H is provided at each end with a crank, I I', upon which are secured shoes J, having convex or curved outer surfaces, $j$. These shoes, by virtue of their location on the ends of the cranks I I', project into a drum, K, one of which is secured to the inner sides of the spokes of each wheel by means of projections $k$ and wires or clips $k'$, as shown in Fig. 1. The rod H has secured to one or both of its rounded portions an arm, L, projecting at right angles therefrom, which arm is connected by a link, M, to any suitable and well-known construction of brake-operating lever, (not shown,) which may be secured to any desirable portion of the wagon, so as to be within easy reach of the driver, and which may be provided with the well-known rack and pawl for securing it in its locked position.

The operation of my improved brake may be described as follows: It being desired to brake the wheel, the hand-lever is drawn forward, carrying with it, by means of the link M, the arm L. This turns the brake-supporting rod H, bringing the shoes forward and causing them to impinge upon the interior surface of the drum, and thus retard or totally stop the motion of the wheel. The position of the cranks and shoes is such that any continued forward rotation of the wheels and drums will have a tendency to wedge the shoes tighter against the surface of the drum, and thus automatically, as it were, exert a greater force— viz., the force of the wheel itself—to stop the wagon.

The device is very compactly constructed and is very powerful in action. The drums and shoes may be renewed when worn, and the unsightly rubbers for the tires, as usually employed in vehicle-brakes, are dispensed with. The whole device can be readily removed for purposes of repair and otherwise. The power may be increased or diminished at will by changing the points of connection of the links M to the arms L by means of the series of perforations $l$, the power being increased as the point of connection is removed outward, and vice versa.

There are very few parts and they are all of metal, so that the cost of construction is reduced to a minimum, as well as also the liability to breakage or getting out of order.

No difficulty will be experienced in attaching my brake to vehicles already in use.

The brakes may be applied to one or both of the hind wheels.

Having thus fully described my invention, what I claim, and desire to secure by Letters Patent of the United States, is—

1. A vehicle-brake provided with a supporting-rod resting in bearings secured to the axle, a crank on the end of said rod carrying a shoe, and a drum secured on the inside of the spokes of the wheel, against the interior surface of which drum the shoe engages, as set forth.

2. A vehicle-brake consisting of a rod resting in bearings and lying parallel with the axle, a crank on either end of said rod, a shoe located at the outer end of each crank, a drum secured by clips to the inside of the spokes of the wheels, and a lever, L, for connections with the ordinary hand or foot operating mechanism, as set forth.

3. In combination, the axle, the bolster resting thereon, the plate F, carrying brackets G, and securely clamped to the axle and bolster by bolts, the rod H, resting in said bracket G, the cranks I I', the shoes J, located at the outer ends of said crank, and the drum secured to the wheels for engaging said shoes, as set forth.

In testimony that I claim the foregoing as my own I affix my signature in presence of two witnesses.

EDWARD HAMLIN BACON.

Witnesses:
WM. WATIES,
W. R. OREAR.